United States Patent [19]
Cassidy

[11] Patent Number: 4,867,522
[45] Date of Patent: Sep. 19, 1989

[54] WAVELENGTH SENSITIVE OPTICAL DEVICES

[75] Inventor: Stephen A. Cassidy, Ipswich, England

[73] Assignee: British Telecommunications public limited company, United Kingdom

[21] Appl. No.: 174,793

[22] PCT Filed: Jul. 17, 1987

[86] PCT No.: PCT/GB87/00508

§ 371 Date: Mar. 21, 1988

§ 102(e) Date: Mar. 21, 1988

[87] PCT Pub. No.: WO88/00716

PCT Pub. Date: Jan. 28, 1988

[30] Foreign Application Priority Data

Jul. 22, 1986 [GB] United Kingdom ............... 8617880

[51] Int. Cl.[4] ............................................. G02B 6/28
[52] U.S. Cl. .............................. 350/96.19; 350/96.29
[58] Field of Search ............... 350/96.15, 96.19, 96.29

[56] References Cited

U.S. PATENT DOCUMENTS

| | | | |
|---|---|---|---|
| 4,634,215 | 1/1987 | Reule | 350/96.15 X |
| 4,636,031 | 1/1987 | Schmadel, Jr. et al. | 350/96.19 |
| 4,723,829 | 2/1988 | Koonen | 350/96.19 |
| 4,746,186 | 5/1988 | Nicia | 350/96.19 X |
| 4,773,063 | 9/1988 | Hunsperger et al. | 350/96.19 X |

FOREIGN PATENT DOCUMENTS 0095563 12/1983 .
2558607 7/1985 France .
8602171 4/1986 World Int. Prop. O. .

OTHER PUBLICATIONS

Applied Optics, vol. 20, No. 23, 12/1/81.
Applied Physics Letters, vol. 37, No. 10, 11/15/80.
Soviet Journal of Quantum Electronics, vol. 12, No. 4, Apr. 1982, American Institute of Physics (New York, US), Yu. A. Bykovskii et al: "Investigation of Light Wave Diffraction in a Waveguide Plane by Optically Induced Dynamic Gratings"-pp. 418–421.
Applied Physics Letters, vol. 32, No. 10, May 15, 1978, American Institute of Physics (New York, US), K. O. Hill et al: "Photosensitivity in Optical Fiber Waveguides: Application to Reflection Filter Fabrication", pp. 647–648.
Applied Optics, vol. 22, No. 5, Mar. 1983, Optical Society of America (New York, US), G. T. Sincerbox et al: "Opto-Optical Light Deflection", pp. 690–697.
Applied Physics Letters, vol. 48, No. 1, Jan. 6, 1986 (New York, US), E. S. Goldburt et al: "Electro-Optical Response of a Liquid-Crystalline Fiber Coupler", pp. 10–12.
Proceedings of the 6th European Conference on Optical Communications, University of York (GB), Sep. 16–19, 1980, I. Bennion et al: "Grating Components in Birefringent Photochromic Optical Waveguides", pp. 260–263.

Primary Examiner—William L. Sikes
Assistant Examiner—Akm E. Ullah
Attorney, Agent, or Firm—Nixon & Vanderhye

[57] ABSTRACT

An optical device for use as an optical filter or modulator comprises an optical waveguide including a portion having a refractive index that varies with optical intensity and a mechanism for providing and directing at least two coherent waves at that portion such that a standing wave of a modulated refractive index is established by interference between the coherent waves. The standing wave provides a temporary modulated index grating in the waveguide.

20 Claims, 2 Drawing Sheets

WAVELENGTH SENSITIVE OPTICAL DEVICES

FIELD OF THE INVENTION

This invention relates to wavelength sensitive optical devices and in particular to optical devices for use in optical signal modulation or filtering.

BACKGROUND AND SUMMARY OF THE INVENTION

A permanently modulated index overlay on a waveguide such as a D-fibre will act as a wavelength filter by selectively reflecting a specific wavelength within the waveguide. Gratings scribed on the surface of a D-fibre have also been used as wavelength filters with the guided light impinging on to the grating from within the fibre and the grating sensitive wavelength being reflected.

However the devices produced have the disadvantage that they operate at fixed wavelengths and do not allow for tuning. The techniques employed also relate to optical signals already within a waveguide and do not allow for interfacing with external optical signal sources.

Dynamic diffraction gratings have been generated in a two dimensional slab waveguide of semiconducting material irradiated by two interfering light beams. Bykovskii et al describe such gratings in an article in the Soviet Journal of Quantum Electronics, Vol. 12, No. 4, Apr. 1982, entitled "Investigation of light wave diffraction in a waveguide plane by optically induced dynamic gratings". Techniques for producing dynamic transmission gratings are also described by Sincerbox in published European patent application EP 95563. The devices described both by Bykovskii et al and by Sincerbox are designed to provide angular dispersion of different input wavelengths. As such these devices may be useful, for example, for spectral analysis of a composite optical input.

However, these devices do not address or solve the problem of interfacing a spatially multiplexed optical processor with a one dimensional wavelength multiplexed waveguide.

With wavelength division multiplexed (WDM) systems or coherent systems it is usual to use external modulators each with a separate narrow bandwidth source. It is generally difficult to obtain a large number of sources of slightly different wavelength. WDM implementation may require, for example, grading of a large number of nominally identical lasers or the use of turnable lasers and multiple filters.

The present invention is directed towards providing optical devices which may be used for the desired interfacing function, for example as modulators or filters, and which do not require a large number of separate sources.

For the avoidance of doubt within the context of this specification 'optical' includes not only the visible spectrum but also all wavelengths extending into the ultra violet and into the infra red and transmissible by an optical waveguide.

According to the present invention an optical device comprises a one-dimensional optical waveguide including a portion having a refractive index that varies with optical intensity and means for providing at least two coherent waves directed at said portion to form a standing wave therein, thereby to create a modulated refractive index within the waveguide portion.

The term 'one-dimensional' is used here to imply that an optical signal will propagate through the waveguide substantially in one-dimension only. This is in particular contrast with slab waveguides, sometimes referred to as 'planar' waveguides, where propagation in at least two dimensions is possible.

Preferably, the wavefronts of the waves are arranged to be substantially orthogonal to the longitudinal axis of the variable refractive index portion of the waveguide and the standing wave is created longitudinally in that portion, such that lines of constant refractive index run transversely across the direction of signal propagation along the waveguide.

Conveniently the coherent waves will be plane waves, at least substantially plane where the waves are indicent on the variable refractive index portion of the waveguide.

Preferably the one-dimensional waveguide will comprise an optical fibre. Alternatively, for example, the one-dimensional waveguide may comprise an integrated optical waveguide (eg using InGaAs or the like).

Conveniently, the variable refractive index portion comprises a length of optical fibre with a D-section and an overlay of a suitable non-linear medium whose refractive index varies with optical intensity at one or more wavelengths.

Alternatively, for example, the variable refractive index portion of the waveguide may be provided by doping the waveguide with a medium exhibiting the required non-linear properties. In an optical fibre the non-linear dopant may be incorporated in the fibre core.

Preferably the device further comprises means for adjusting the angular separation between the coherent waves so as to tune the refractive index modulation.

In a preferred embodiment the device includes means for modulating at least one of said coherent waves so as to modulate the standing wave.

Preferably a plurality of different standing waves are established between a common primary beam and a plurality of modulated secondary beams. The primary and secondary beams are conveniently of the same wavelength and may be derived from the same source. Each secondary beam may be differently angularly spaced from the primary beam in order to tune the associated standing wave to reflect and modulate a signal of a particular wavelength within the waveguide.

Also according to the present invention an optical device for modulating wavelength multiplexed optical signals comprises a one-dimensional optical waveguide including a portion having a refractive index that varies with optical intensity, means for providing pairs of coherent waves directed at said portion, each pair having a different angular separation for establishing a plurality of standing waves within the said portion, each standing wave being associated with one of the wavelength multiplexed optical signals and having a wavelength different to each other standing wave, and means for modulating one of each pair of coherent waves to dynamically modulate each standing wave and associated optical signal.

In this preferred embodiment the invention provides an efficient means for simultaneous parallel modulation or filtering of WDM signals in an optical waveguide. This parallel processing facility offers the advantages of more effective use of the bandwidth of optical waveguides and of the speed of optical transmission. For example, using an eight component WDM, the individual electro-optic modulators could potentially be run at the maximum electronic bit rate thereby allowing a full 8-bit word to be transmitted 8 times faster than would be the case for a serial time division multiplex (TDM).

Furthermore, the modulation or filtering for each component wavelength of the WDM signals is achieved by the appropriate angular spacing of the interfering pairs of waves, which are conveniently all of the same wavelength. Consequently, since there is no need to separate each component wavelength of the WDM signals for modulation, the WDM signals may be derived from a single multi-band or spread spectrum source coupling directly into the waveguide. Thus there is no longer a necessity for the complex source grading and filtering mentioned above.

Additionally or alternatively to its use as a modulator or filter, if the wavelengths of the interfering primary and secondary beams are made to differ, then the device may be used to shift the wavelength of signals in the waveguide.

Another aspect of the invention provides a method of modulating an optical signal in a one dimensional optical waveguide comprising causing at least two coherent waves to interfere within a portion of the waveguide that has a refractive index that varies with optical intensity, establishing a standing wave of modulated refractive index within the said portion, and modulating one of the coherent waves to dynamically modulate the standing wave thereby to correspondingly modulate the optical signal.

In a preferred form the invention provides a method of modulating wavelength multiplexed optical signals in a one dimensional optical waveguide comprising providing pairs of coherent waves, each pair having a different angular separation, causing each pair of coherent waves to interfere within a portion of the waveguide that has a refractive index that varies with optical intensity, establishing a plurality of standing waves within the said portion, each standing wave being associated with one of the wavelength multiplexed optical signals and having a wavelength different to each other standing wave, and modulating one of each pair of coherent waves to dynamically modulate each standing wave and associated optical signal.

BRIEF DESCRIPTION OF THE DRAWINGS

The invention is now described by way of example with reference to the accompanying drawings in which.

DETAILED DESCRIPTION

Figure 1:
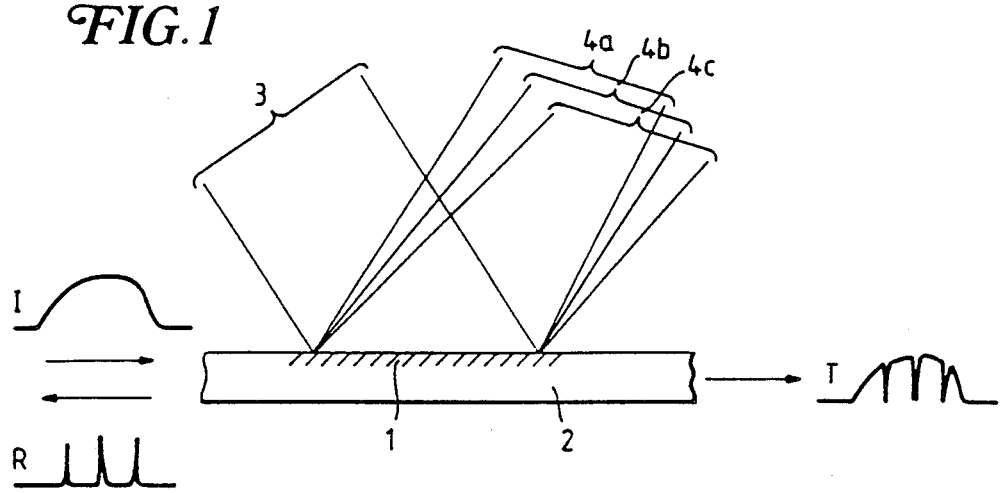
FIG. 1 is a diagram illustrating the operation of the present invention.

The principle of the invention, shown in FIG. 1, is based upon establishing a grating 1 within a portion of a one-dimensional optical waveguide 2 that comprises an optical intensity dependent refractive index medium.

This grating is established by interference between two external coherent beams 3 and 4 forming a standing wave that modulates the refractive index of the medium. If the beams 3 and 4 are constant then a constant grating will be maintained, which will act as a wavelength filter. However, if one of the beams is modulated, for example by amplitude or phase modulation, then the grating will become similarly dynamically modulated. Light within the waveguide, which may be a continuum, or a group of several wavelengths, will be selectively reflected at the grating dependent upon the instantaneous condition of the grating. Thus the selected wavelength will be reflected to a greater or lesser extent and will be modulated in accordance with the original modulation imposed on the external beam.

For a given external beam wavelength, the spacing of the grating and the wavelength that is reflected within the waveguide depends upon the angle between the beams 3 and 4. If the beams 3 and 4 include a large angle (eg are at opposite glancing angles to the surface) the reflected wavelength is approximately half the incident wavelength. If the included angle is 60° the reflected wavelength is the same as that of the incident beams and if the incident beams become almost parallel to one another and perpendicular to the surface, the reflected wavelength is larger than the incident wavelength. Thus by selecting the relative angles of the incident beams a specific wavelength for reflection is selected. In the simplest case two beams form an erasable filter, which may be removed or tuned by adjustment of the angle between the incident beams.

If one of the external beams, say that referenced 4, is subdivided into several secondary beams 4a, 4b, 4c that are angularly spaced, then each of these will interfere with the beam 3 to form a grating selective for a different wavelength. Each of the beams 4a, 4b, 4c may be subjected to modulation and so a plurality of dynamic gratings selectively modulating different wavelengths are formed simultaneously within the waveguide. This configuration enables WDM signals in the waveguide to be individually modulated using spatially separated external modulated signals.

FIG. 1 also includes representative spectral diagrams illustrating broadband input I, and reflected R and transmitted T output signals illustrating the device operation.

The gratings are more efficient the greater the is fringe contrast (in this case the sharpness of the refractive index modulations). To obtain a good fringe contrast in the induced gratings the optical power in each of the secondary beams 4 is approximately equal, and the optical power in the primary beam 3 is approximately equal to the sum of the powers in the secondary beams. The efficiency is also affected by the length of the induced grating. Consequently, a lack of contrast may to some extent be compensated by increasing the length of the sensitive portion 1 in which the interference occurs.

Figure 2:
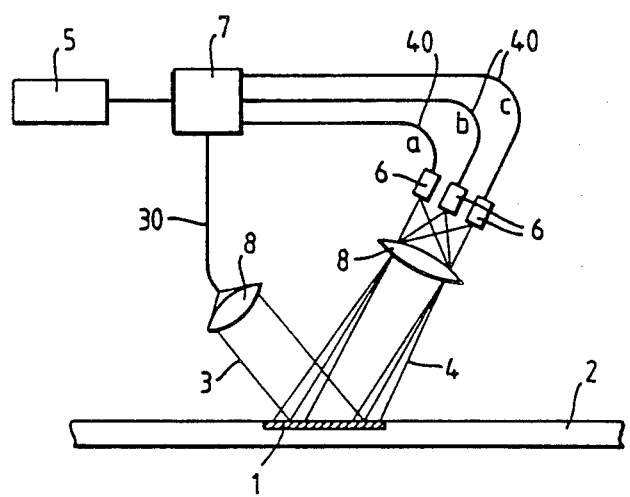
FIG. 2 is a schematic diagram of a preferred embodiment of the invention including modulation.

FIG. 2 shows a preferred embodiment of the invention in which light from a coherent optical source 5 is split via a star coupler 7 between optical fibres 30 and 40 which carry the light required for beams 3 and 4 respectively. The star coupler 7 is designed so that roughly half the total available optical power is delivered in the primary beam 3 while the balance is shared approximately equally between each of the beams 4.

The primary beam 3 is directed without modulation onto the intensity sensitive portion 1 of the waveguide 2 using suitable beam collimating apparatus 8. Light for the secondary beams 4 is first passed by the fibres 40 to the modulators 6. The modulators 6 may be any suitable modulators, for example saturable absorbers, non-linear etalons or non-linear Mach-Zender interferometers in semiconductor doped glass. The modulated beams 4 are then directed, also via suitable beam collimating apparatus 8 onto the sensitive portion 2, each modulated beam 4 being at a different angle to the primary beam 3. The angular separation of the beams determines the sensitivity of WDM channel selection. For a wavelength in the waveguide of around 1.3 micrometers a 1/20° angular separation of the secondary beams 4 provides separation between adjacent channels of one part in $10^4$.

For added security of transmission a second modulation may be applied to the various induced gratings by modulating the primary beam 3. During demodulation this second modulation may be removed by reflection from or coupling through a second dynamic grating of complementary modulation.

It is also possible that incident beams of different wavelengths may be used, or more than one primary beam, especially if the primary beams are subjected to modulations.

Depending on the choice of medium used for the variable refractive index portion, there may be some delay in the response of the non-linear component of the waveguide to changes in the optical field when modulating an induced grating. Light has a frequency of the order of $10^{14}$ Hz, for example, whilst the refractive index change for semiconductor doped glass takes place with a frequency of the order of $10^{12}$ Hz. However typical data rates are only in the range of $10^6$ to $10^{10}$ Hz and are therefore not affected by the comparative sluggishness of the grating response to optical field changes.

Figure 3:
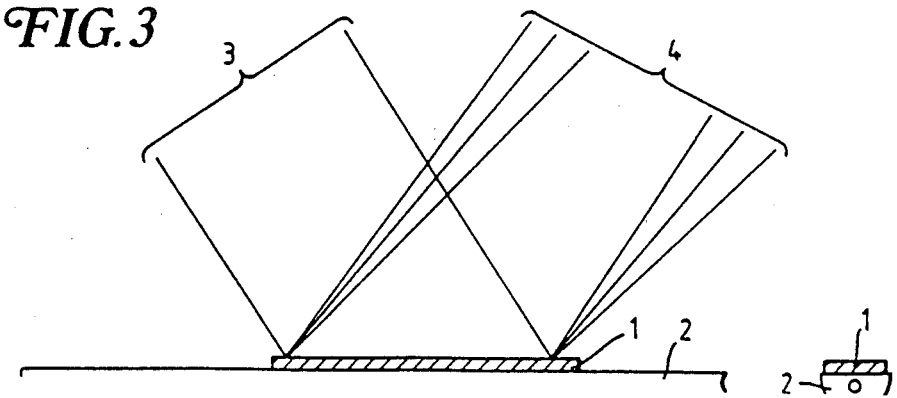
FIG. 3 illustrates a variation in an embodiment of the present invention.

It is possible for the non-linear component of the waveguide to be an overlay, for example doped glass or an organic material, or for the waveguide itself to be doped with, for example, cadmium sulphide selenide. FIG. 3 shows a D-fibre waveguide 2 provided with an overlay of non-linear material forming the sensitive portion 1 for use in an embodiment of the present invention.

Some example configurations in which the present invention may be employed are illustrated schematically in FIG. 4. An optical device 13 according to the invention used as a modulator may be positioned between a source 10, such as a laser source, and an output fibre as in FIG. 4a. Alternatively, the device may be used in reflection mode as in FIG. 4b where the modulator abuts the source and operates such that only the reflected wavelengths will lase. Another configuration with the modulator 13 operating in reflection mode with output via a directional coupler 14 is shown in FIG. 4c. Reference numeral 15 in this and other figures indicates a non-reflective termination of a limb of a coupler.

Figure 4A:
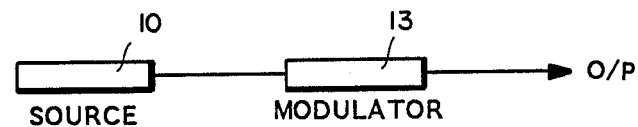
FIGS. 4a–4e illustrate schematically some of the various configurations in which the invention may be used.
Figure 4B:
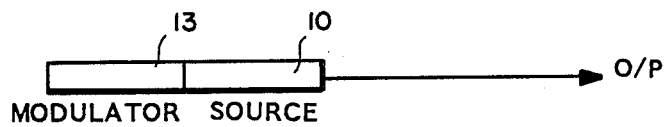
Figure 4C:
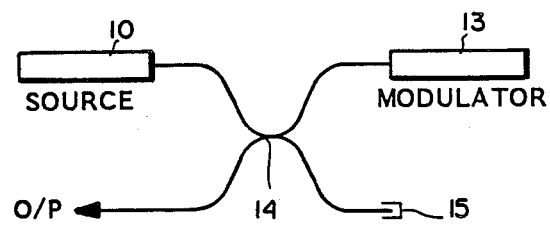
Figure 4D:
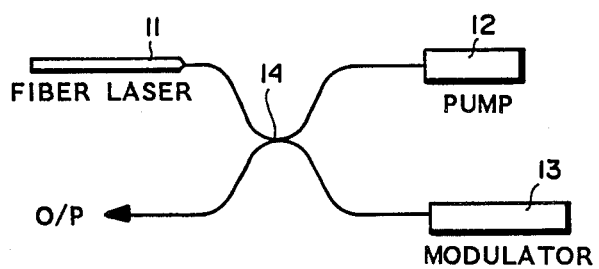
Figure 4E:
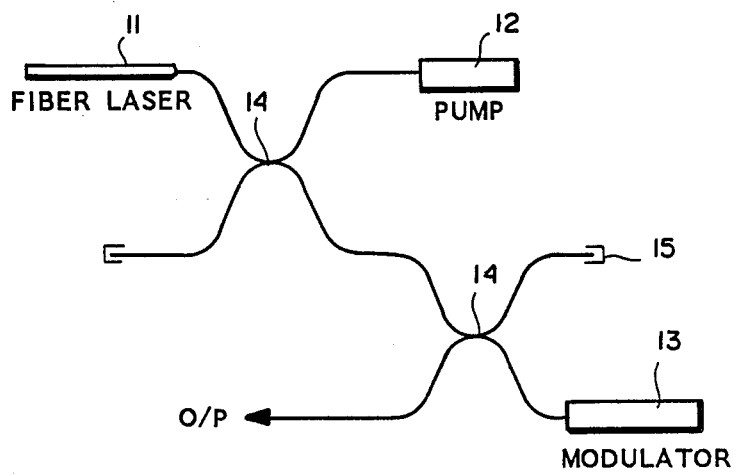

Fibre lasers may be advantageously used in conjunction with the invention because of the closely spaced wavelengths that are available. The filter or modulator described may then conveniently be incorporated as part of the cavity of a fibre laser. FIGS. 4d and 4e illustrate configurations where the separate device is used as a modulator in combination with a fibre laser 11 driven by a pump 12. The additional coupler 14 in FIG. 4e enables the pump to be optically isolated from the overall system output.

It should be noted that when the using the device with interfering (ie primary and secondary) waves of differing wavelength, the device may be made to act as a wavelength shifter. If the two wavelengths are close, the transverse fringes will move along the axis of the waveguide at a speed proportional to their difference and inversely proportional to the angle between the beams. This will introduce a doppler shift in the wavelength of signals reflected by the induced grating, increasing or decreasing the wavelength according to the sense of the motion of the grating (which will depend on which of the primary and secondary beams has the higher frequency). The size of the wavelength shift will depend on the angle between the beams. However, proportionately, the change in wavelength will be of the same order as the proportional difference in wavelength between the interfering beams.

Numerous alternative configurations and uses of devices according to the present invention will be apparent to those skilled in the art.

I claim:

1. An optical device comprising a one-dimensional optical waveguide including a portion having a refractive index that varies with optical intensity and means for providing at least two coherent waves directed at said portion to form a standing wave therein, thereby to create a modulated refractive index within the waveguide portion.

2. An optical device according to claim 1 further comprising means for adjusting the angular separation between the coherent waves so as to tune the refractive index modulation.

3. An optical device according to claim 1 or claim 2 further comprising means for modulating at least one of said coherent waves so as to modulate the standing wave.

4. An optical device according to claim 1 in which the means for providing the coherent waves comprises means for dividing the output from a coherent source over at least two paths and angularly separating the paths.

5. An optical device according to claim 1 wherein the means for providing the coherent waves provides a primary bream and a plurality of secondary beams differently angularly spaced from the primary beam such that a plurality of different standing waves are established by interference between the primary and secondary beams.

6. An optical device according to claim 5 wherein the primary and secondary beams are derived from the same optical source.

7. An optical device according to claim 5 or claim 6 including means for independently modulating a plurality of the secondary beams to form a plurality of different modulated standing waves.

8. An optical device according to claim 5 or 6 further including means for modulating the primary beam.

9. An optical device according to claim 5 including means to provide an optical power in the primary beam substantially equal to the sum of the optical powers of the secondary beams.

10. An optical device according to claim 5 including means to provide substantially the same optical power to each secondary beam.

11. An optical device for modulating wavelength multiplexed optical signals comprising a one-dimensional optical waveguide including a portion having a refractive index that varies with optical intensity, means for providing pairs of coherent waves directed at said portion, each pair having a different angular separation for establishing a plurality of standing waves within the said portion, each standing wave being associated with one of the wavelength multiplexed optical signals and having a wavelength different to each other standing wave, and means for modulating one of each pair of coherent waves to dynamically modulate each standing wave and associated optical signal.

12. An optical device according to claim 11 in which the means for providing pairs of coherent waves provides a common primary beam and differently angularly spaced secondary beams forming the said pairs.

13. An optical device according to any preceding claim 1, 11 or 12 wherein the waveguide comprises an optical fibre.

14. An optical device according to any preceding claim 1, 11 or 12 wherein the variable refractive index portion comprises an overlay of an optically non-linear medium or a D-fibre.

15. An optical device according to any one of claims 1, 2, 4, 5, 6, 11, or 12 wherein the variable refractive index portion comprises a dopant of optically non-linear medium incorporated in the waveguide.

16. An optical device according to any preceding claim 1 or 11 wherein the waveguide comprises part of an optical fibre laser resonant cavity.

17. An optical device according to claim 1, 5 or 11 wherein the means for providing coherent waves provides at least one pair of interfering waves of differing wavelengths for use in shifting the wavelength of a signal within the waveguide.

18. A method of modulating an optical signal in a one dimensional optical waveguide comprising causing at least two coherent waves to interfere within a portion of the waveguide that has a refractive index that varies with optical intensity, establishing a standing wave of modulated refractive index within the said portion, and modulating one of the coherent waves to dynamically modulate the standing wave thereby to correspondingly modulate the optical signal.

19. A method of modulating wavelength multiplexed optical signals in a one dimensional optical waveguide comprising providing pairs of coherent waves, each pair having a different angular separation, causing each pair of coherent waves to interfere within a portion of the waveguide that has a refractive index that varies with optical intensity, establishing a plurality of standing waves within the said portion, each standing wave being associated with one of the wavelength multiplexed optical signals and having a wavelength different to each other standing wave, and modulating one of each pair of coherent waves to dynamically modulate each standing wave and associated optical signal.

20. A method according to claim 19 in which the standing waves are formed by interference between a common primary beam and differently angularly spaced modulated secondary beams.

* * * * *